United States Patent
Jung et al.

(10) Patent No.: US 8,195,230 B2
(45) Date of Patent: Jun. 5, 2012

(54) HEARING-AID-COMPATIBLE MOBILE WIRELESS DEVICE USING MAGNETIC COIL OF VIBRATION MOTOR

(75) Inventors: Won Bae Jung, Suwon-si (KR); Hyung Wook Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1321 days.

(21) Appl. No.: 11/844,172

(22) Filed: Aug. 23, 2007

(65) Prior Publication Data

US 2008/0056519 A1 Mar. 6, 2008

(30) Foreign Application Priority Data

Sep. 5, 2006 (RE) .......................... 10-2006-0085016

(51) Int. Cl.
*H04B 1/38* (2006.01)
*H04R 25/00* (2006.01)
(52) U.S. Cl. ........................................ 455/557; 381/331
(58) Field of Classification Search .................. None
See application file for complete search history.

(56) References Cited

U.S. PATENT DOCUMENTS

| | | | |
|---|---|---|---|
| 2006/0013423 A1* | 1/2006 | Wieczorek et al. | 381/315 |
| 2006/0133633 A1* | 6/2006 | Hyvonen et al. | 381/315 |
| 2008/0056519 A1* | 3/2008 | Jung et al. | 381/315 |
| 2008/0146295 A1* | 6/2008 | Jorgensen et al. | 455/575.3 |

FOREIGN PATENT DOCUMENTS

WO  WO 2006/010378  2/2006

* cited by examiner

*Primary Examiner* — Hoang-Quan Ho
(74) *Attorney, Agent, or Firm* — The Farrell Law Firm, P.C.

(57) ABSTRACT

Provided is a mobile wireless device, which is hearing aid-compatible and overcomes a limitation in space by using a magnetic coil equipped in a vibration motor without requiring an additional T-coil. The vibration motor is selectively connected to one of a data processing unit and a motor driving unit by a switching unit. The magnetic coil in the vibration motor receives a signal from the data processing unit and generates a magnetic field for hearing aid-compatibility. This magnetic signal is provided to an induction coil in a hearing aid a deaf person wears.

8 Claims, 3 Drawing Sheets

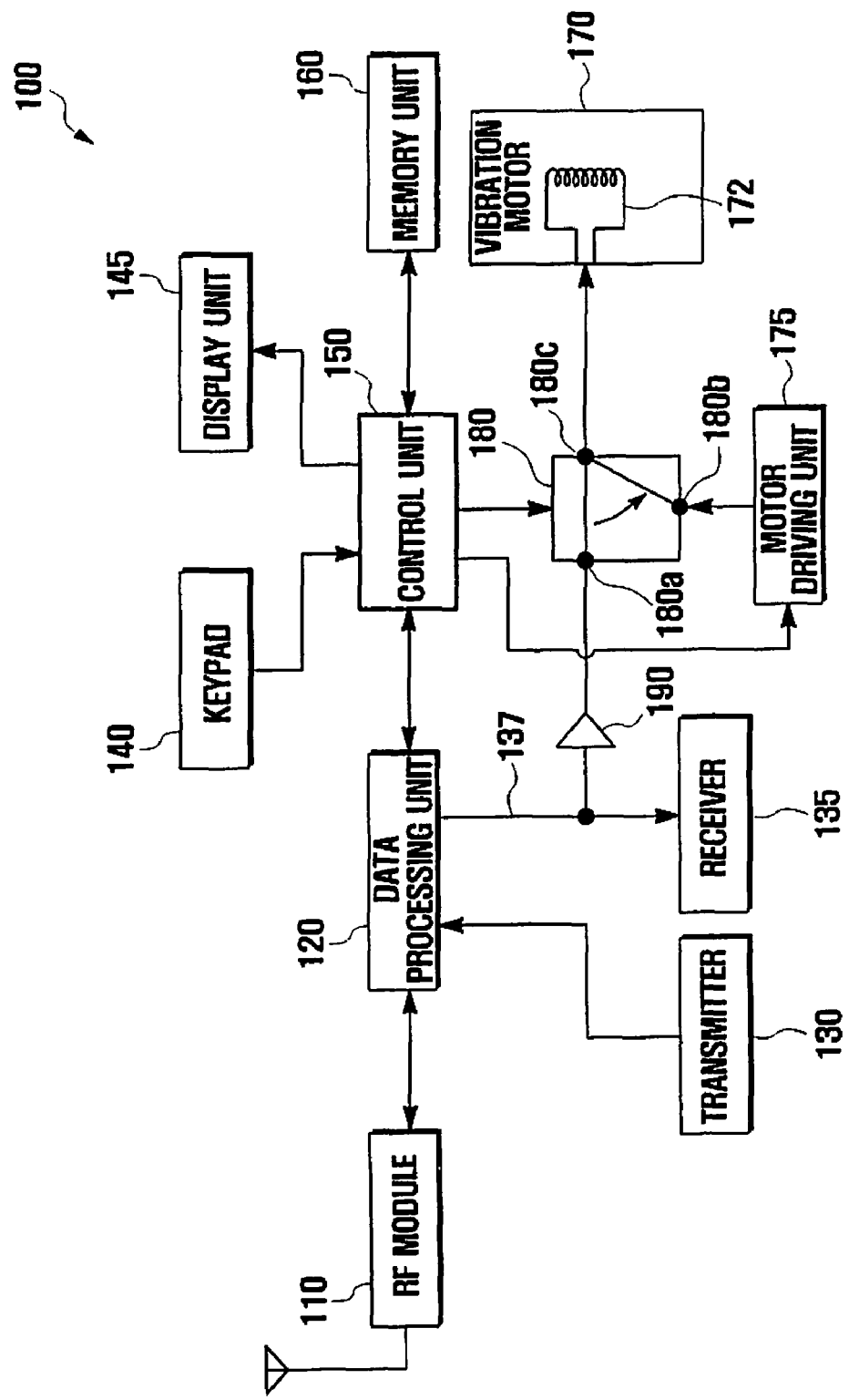

HEARING-AID-COMPATIBLE MOBILE WIRELESS DEVICE USING MAGNETIC COIL OF VIBRATION MOTOR

PRIORITY

This application claims priority under 35 U.S.C. §119 (a) to Korean Patent Application No. 2006-0085016, which was filed in the Korean Intellectual Property Office on Sep. 5, 2006, the contents of which are incorporated herein by reference in its entirety.

BACKGROUND OF THE INVENTION

1. Field of the Invention

The present invention relates generally to a mobile wireless device and, more particularly, to a hearing aid-compatible mobile wireless device using a magnetic coil equipped in a vibration motor.

2. Description of the Related Art

According to rules of the Federal Communication Commission (FCC), at least fifty percent of all the mobile telephone models sold in the United States should meet Hearing Aid-Compatibility (HAC) by 2008. These requirements allow a deaf person to use a mobile telephone without trouble. Therefore all mobile telephone manufacturers have continuously developed hearing aid-compatible mobile telephones.

In order to comply with the FCC requirements for HAC, a mobile telephone should have therein a telecoil (T-coil) that generates a magnetic field. The T-coil converts an electrical signal, which is transmitted to a receiver, into a magnetic signal. Then the magnetic signal is provided to an induction coil in a hearing aid and is output as a voice a deaf person can hear.

In a conventional hearing aid-compatible mobile wireless device, such a T-coil is additionally embedded within body of a receiver or separately mounted outside of the body of a receiver. In the former case, addition of a T-coil to a receiver may cause an increase in size of a receiver. Generally, mobile wireless devices are gradually decreasing in size and thickness, so a receiver equipped with the T-coil therein is also limited in size. Considering this, it is undesirable to embed a T-coil in a receiver. Similarly, the latter case may have a drawback in that there is not enough space to accommodate a T-coil in a mobile wireless device.

SUMMARY OF THE INVENTION

The present invention provides a hearing aid-compatible mobile wireless device that overcomes a limitation in space by using a magnetic coil equipped in a vibration motor.

Furthermore, the present invention provides a hearing aid-compatible mobile wireless device that does not require an additional T-coil by utilizing a magnetic coil existing in a vibration motor.

According to an aspect of the present invention, a hearing aid-compatible mobile wireless device includes a data processing unit demodulating and decoding a received signal; a receiver connected to the data processing unit, said receiver receiving the signal from the data processing unit and converting the signal into sound; a vibration motor selectively connected to the data processing unit, said vibration motor having a magnetic coil receiving the signal from the data processing unit and generating a magnetic field for hearing aid-compatibility; a motor driving unit selectively connected to the vibration motor, said motor driving unit driving the vibration motor by supplying an electric current to the magnetic coil; a switching unit selecting one out of two paths, one of which is between the data processing unit and the vibration motor, the other of which is between the motor driving unit and the vibration motor; and a control unit controlling operations of the motor driving unit and the switching unit.

Preferably, the magnetic field generated by the magnetic coil complies with requirements for Hearing Aid-Compatibility (HAC) of the Federal Communication Commission (FCC).

In this device, the switching unit may have a first point near the data processing unit, a second point near the motor driving unit, and a third point near the vibration motor, the third point being connected to the first point to offer a path between the data processing unit and the vibration motor or being connected to the second point to offer a path between the motor driving unit and the vibration motor.

The data processing unit and the receiver may be connected through a single line or a differential line. In this case, the device further includes an amplifier or a differential amplifier located on the path between the data processing unit and the vibration motor, the amplifier producing amplification of the signal transmitted from the data processing unit to the vibration motor.

The device further includes at least one passive device located on the path between the data processing unit and the vibration motor.

BRIEF DESCRIPTION OF THE DRAWINGS

The above and other aspects, features, and advantages of the present invention will be more apparent from the following detailed description taken in conjunction with the accompanying drawings, in which:

FIG. 1 is a block diagram illustrating a hearing aid-compatible mobile wireless device in accordance with an exemplary embodiment of the present invention;

DETAILED DESCRIPTION OF THE EXEMPLARY EMBODIMENTS

Figure 2A:
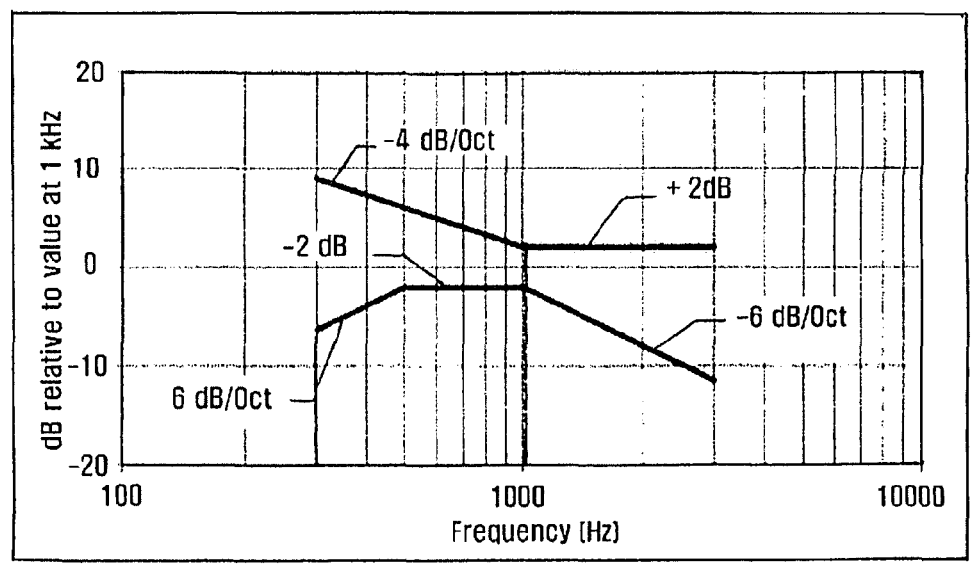
FIGS. 2A and 2B are graphs showing variation of the strength of the magnetic field according to the FCC requirements for HAC.

Exemplary, non-limiting embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will convey the scope of the invention to those skilled in the art. The principles and features of this invention may be employed in varied and numerous embodiments without departing from the scope of the invention.

Well-known structures and processes are not described or illustrated in detail to avoid obscuring the essence of the present invention. Like reference numerals are used for like and corresponding parts of the various drawings.

A mobile wireless device according to the present invention includes a great variety of third-generation phones, fourth-generation phones, Personal Digital Assistant (PDAs), smart phones, etc. The following embodiments may be favorably applied to the above-listed respective devices.

FIG. 1 illustrates, in a block diagram, a hearing aid-compatible mobile wireless device in accordance with an exemplary embodiment of the present invention.

Referring to FIG. 1, the mobile wireless device 100 includes a Radio Frequency (RF) module 110, a data processing unit 120, a transmitter 130, a receiver 135, a keypad 140, a display unit 145, a control unit 150, and a memory unit 160. Additionally, the mobile wireless device 100 further includes a vibration motor 170 having a magnetic coil 172, a motor driving unit 175, and a switching unit 180.

The RF module 110 performs the function of wireless communication for the device 100. Specifically, the RF unit 110 up-converts the frequency of signals being transmitted and amplifies the up-converted signals. Further, the RF unit 110 amplifies with low-noise signals being received and down-converts the frequency thereof. The RF module 110 may have a duplexer that separates transmission and reception paths.

The data processing unit 120 encodes and modulates signals being transmitted through the RF module 110, and demodulates and decodes signals being received through the RF module 110. The data processing unit 120 may be composed of a modulator/demodulator (modem) and a codec (coder/decoder (codec).

The transmitter 130 converts incident sounds into electrical signals and sends them to the data processing unit 120. The receiver 135 receives signals of voice bandwidth and converts them into voice signals. Especially, a signal path from the data processing unit 120 is connected to the vibration motor 170, which will be described later, as well as the receiver 135. The data processing unit 120 and the receiver 135 can be connected through a single line 137 as in this embodiment or alternatively through a differential line as described later.

The keypad 140 offers a user interface to produce input signals depending on a users action for operating the device 100. The keypad 140 is exemplary only and not to be considered as a limitation of the present invention. The mobile wireless device 100 may have any other kinds of input units such as a touch pad, a touch screen, a scroll wheel, and an optical jog wheel, etc.

The display unit 145 also offers a user interface to represent information, in visual manner, related to the operation of the device 100. The display unit 145 is generally a Liquid Crystal Display (LCD). However, any other kinds of display units may be alternatively used.

The control unit 150 controls the operation of the device 100, especially the motor driving unit 175 and the switching unit, both of which will be described later.

The memory unit 160 stores various programs executed in the device 100 and related data. The memory unit 160 may be composed of at least one volatile and/or non-volatile memory device.

The vibration motor 170 generates a vibration when a call or a message is received in a case where the alert type is set to vibration. The vibration motor 170 has the magnetic coil 172 and is selectively connected to the motor driving unit 175. Specifically, when a call or a message is received, a path between the motor driving unit 175 and the vibration motor 170 is formed. Here, the motor driving unit 175 drives the vibration motor 170 by supplying the electric current to the magnetic coil 172 under control of the control unit 150.

Particularly, the magnetic coil 172 has the function of generating the magnetic field required to meet Hearing Aid-Compatibility (HAC). The vibration motor 170 can be selectively connected to the data processing unit 120. Therefore, a signal transmitted to the receiver 135 from the data processing unit 120 can be also transmitted to the vibration motor 170. An electrical signal input in the vibration motor 170 is converted into a magnetic signal through the magnetic coil 172. This magnetic signal is provided to an induction coil in a hearing-aid (not shown) a deaf person wears, and is output as a voice signal a deaf person can hear.

Figure 2B:
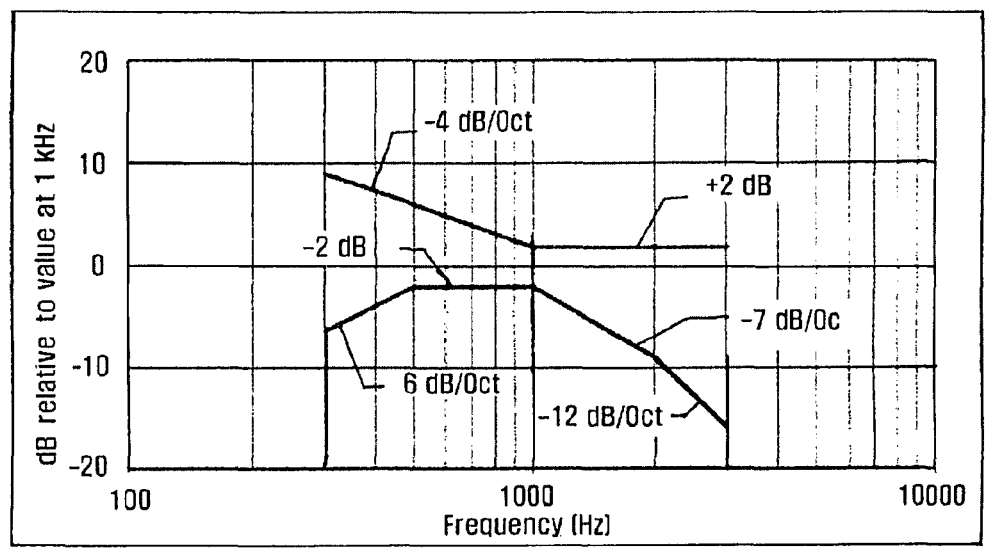

FIGS. 2A and 2B are graphs showing variation of the strength of the magnetic field according to the FCC requirements for HAC. Specifically, FIG. 2A represents the strength of the magnetic field by frequency of voice bandwidth in a case where the strength of the magnetic field does not exceed −15 dB(A/m) at 1 kHz. In addition, FIG. 2B represents the strength of the magnetic field by frequency of voice bandwidth in a case where the strength of the magnetic field exceeds −15 dB(A/m) at 1 kHz.

Since a magnetic signal generated at the magnetic coil 172 is provided to the induction coil in the hearing-aid, the vibration motor 170 should be located at a proper position to generate the magnetic field toward the hearing-aid. That is, the vibration motor 170 should be adjacent to the receiver 130.

As discussed heretofore, the vibration motor 170 not only performs a normal function to generate vibration, but also performs an additional function to generate the magnetic field. In order to selectively perform both functions, the vibration motor 170 is selectively connected to the motor driving unit 175 or the data processing unit 120. The switching unit 180 makes selective connection for the vibration motor 170.

The switching unit 180 has three contact points, namely, a first point 180a near the data processing unit 120, a second point 180b near the motor driving unit 175, and a third point 180c near the vibration motor 170. The third point 180c is connected to the first point 180a to offer a path between the data processing unit 120 and the vibration motor 170, or alternatively connected to the second point 180b to offer a path between the motor driving unit 175 and the vibration motor 170. A well-known switch such as a Single Pole Double Throw (SPDT) switch or a Micro-Electro Mechanical System (MEMS) switch can be favorably used for the switching unit 180.

The control unit 150 controls the operation of the switching unit 180. When an event such as a received call or a received message happens in a vibration mode, the control unit 150 controls the switching unit 180 to make a path between the motor driving unit 175 and the vibration motor 170. Furthermore, the control unit 150 controls the motor driving unit 175 to supply the electric current to the magnetic coil 172. The supply of the electric current is maintained while a call is being received or for a predefined time after a message is received. On the other hand, when a signal the RF module 110 receives is inputted through the data processing unit 120, the control unit 150 controls the switching unit 180 to make a path between the data processing unit 120 and the vibration motor 170.

The mobile wireless device 100 in this embodiment may further include an amplifier 190, which produces amplification of an electrical signal transmitted from the data processing unit 120 to the vibration motor 170. The amplifier 190 may be used when a signal outputted from the data processing unit 120 fails to generate the magnetic field enough to meet the FCC requirements for HAC.

The voltage required for driving the vibration motor 170 by the electric current supplied from the motor driving unit 175 is about 3.1~3.3 Volts. In comparison with this, the voltage when a signal is transmitted from the data processing unit 120 to the magnetic coil 172 is only about 1~2 Volts. This voltage is insufficient for driving the vibration motor 170. Therefore, although receiving a signal from the data processing unit 120, the magnetic coil 172 will generate only the magnetic field without driving the vibration motor 170.

Figure 3:
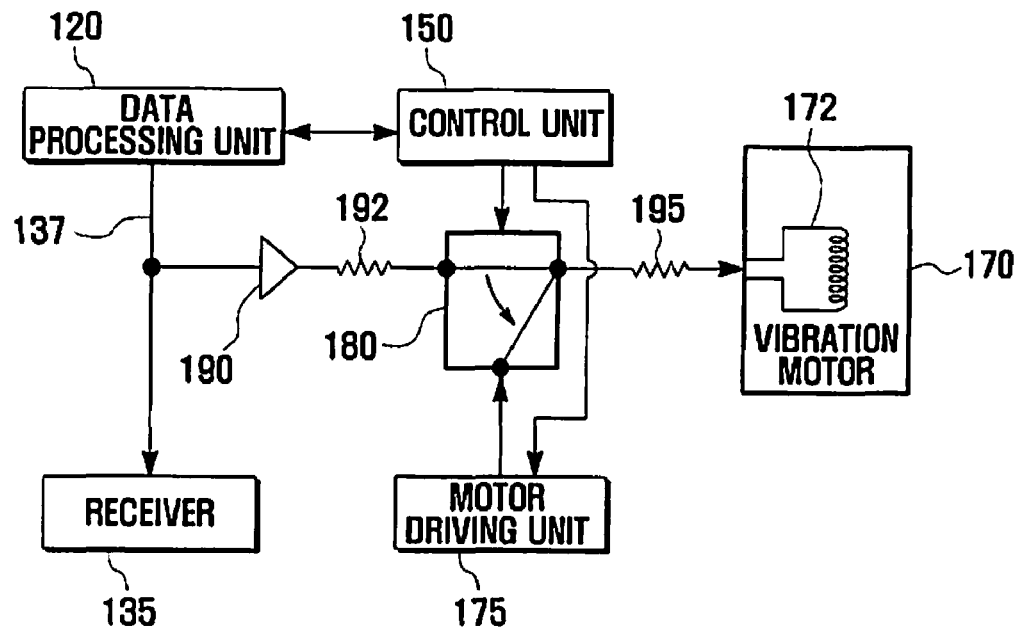
FIG. 3 is a block diagram illustrating a hearing aid-compatible mobile wireless device in accordance with another exemplary embodiment of the present invention.

FIG. 3 illustrates, in a block diagram, a hearing aid-compatible mobile wireless device in accordance with another exemplary embodiment of the present invention.

As shown in FIG. 3, suitable numbers of resistors 192 and 195 may be added to a path between the data processing unit 120 and the vibration motor 170. In addition, any other passive devices such as capacitors and inductors may also be used. The reason that such passive devices are used on a path between the data processing unit 120 and the vibration motor 170 is for impedance matching, frequency tuning, etc. A person skilled in the art may choose optimum types, numbers, coupling points, etc. of passive devices.

Except the resistors 192 and 195, the other elements and their operations have been already described in the previous embodiment. So descriptions will be omitted.

Figure 4:
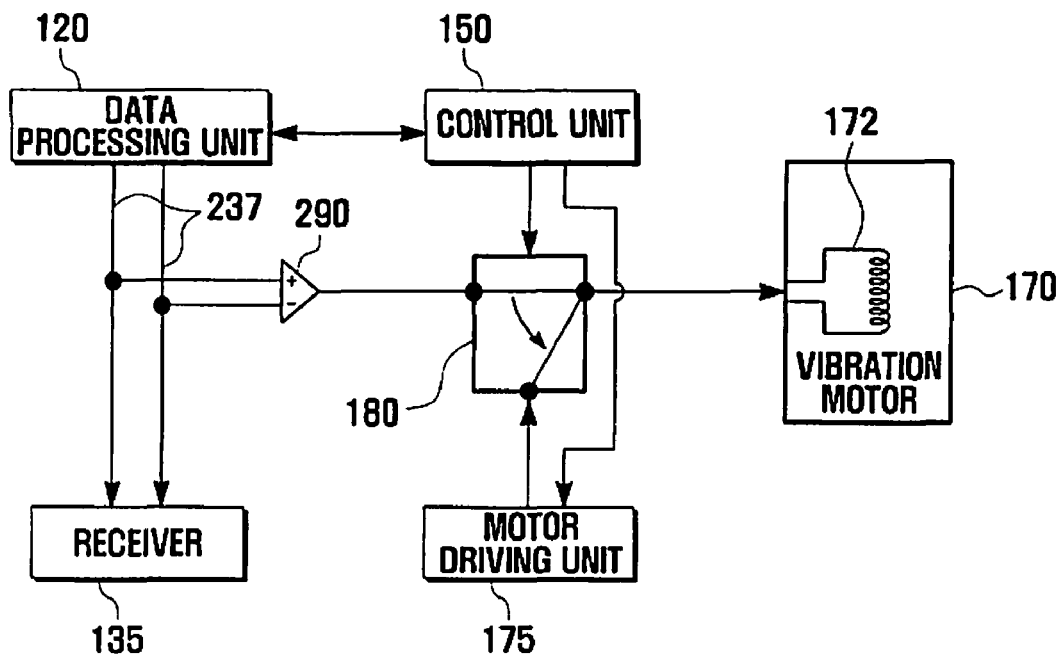
FIG. 4 is a block diagram illustrating a hearing aid-compatible mobile wireless device in accordance with still another exemplary embodiment of the present invention.

FIG. 4 illustrates, in a block diagram, a hearing aid-compatible mobile wireless device in accordance with still another exemplary embodiment of the present invention.

In the aforementioned embodiments, the data processing unit 120 and the receiver 130 are connected through a single line (137 shown in FIGS. 1 and 3). In comparison with this, the embodiment shown in FIG. 4 uses a differential line 237 to connect the data processing unit 120 and the receiver 135. As well known, the differential line 237 is composed of two signal transmission lines that transmit information by means of two complementary signals, and reduces any influence due to interference or noise between signals. According by, when the differential line 237 is used, an amplifier in this embodiment is a differential amplifier 290, which is well known in the art. Furthermore, at least one passive device may be added to a path between the data processing unit 120 and the vibration motor 170.

As discussed above, the mobile wireless device of the present invention is hearing aid-compatible and overcomes a limitation in space by using a magnetic coil equipped in a vibration motor. Furthermore, the hearing aid-compatible mobile wireless device of the present invention does not require an additional T-coil by utilizing a magnetic coil existing in a vibration motor.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A hearing aid-compatible mobile wireless device, comprising:
    a data processing unit demodulating and decoding a received signal;
    a receiver connected to the data processing unit, the receiver receiving the signal from the data processing unit and converting the signal into sound;
    a vibration motor selectively connected to the data processing unit, the vibration motor having a magnetic coil receiving the signal from the data processing unit and generating a magnetic field for hearing aid-compatibility;
    a motor driving unit selectively connected to the vibration motor, the motor driving unit driving the vibration motor by supplying an electric current to the magnetic coil;
    a switching unit selecting one of two paths, one of which is between the data processing unit and the vibration motor, the other of which is between the motor driving unit and the vibration motor; and
    a control unit controlling operations of the motor driving unit and the switching unit.

2. The device of claim 1, wherein the magnetic field generated by the magnetic coil complies with requirements for Hearing Aid-Compatibility (HAC) of the Federal Communication Commission (FCC).

3. The device of claim 1, wherein the switching unit has a first point near the data processing unit, a second point near the motor driving unit, and a third point near the vibration motor, the third point being connected to the first point to offer a path between the data processing unit and the vibration motor or being connected to the second point to offer a path between the motor driving unit and the vibration motor.

4. The device of claim 1, wherein the data processing unit and the receiver are connected through a single line.

5. The device of claim 4, further comprising:
    an amplifier located on the path between the data processing unit and the vibration motor, said amplifier producing an amplification of the signal transmitted from the data processing unit to the vibration motor.

6. The device of claim 1, wherein the data processing unit and the receiver are connected through a differential line.

7. The device of claim 6, further comprising:
    a differential amplifier located on the path between the data processing unit and the vibration motor, said amplifier producing an amplification of the signal transmitted from the data processing unit to the vibration motor.

8. The device of claim 1, further comprising:
    at least one passive device located on the path between the data processing unit and the vibration motor.

* * * * *